United States Patent
Sastri

(10) Patent No.: US 10,778,636 B2
(45) Date of Patent: Sep. 15, 2020

(54) DYNAMIC CREDENTIAL BASED ADDRESSING

(71) Applicant: ColorTokens, Inc., Santa Clara, CA (US)

(72) Inventor: Bharat Sastri, Pleasanton, CA (US)

(73) Assignee: COLORTOKENS, INC. CA (US)

( * ) Notice: Subject to any disclaimer, the term of this patent is extended or adjusted under 35 U.S.C. 154(b) by 144 days.

(21) Appl. No.: 15/636,190

(22) Filed: Jun. 28, 2017

(65) Prior Publication Data

US 2017/0374014 A1     Dec. 28, 2017

Related U.S. Application Data

(60) Provisional application No. 62/355,415, filed on Jun. 28, 2016.

(51) Int. Cl.
*H04L 29/12* (2006.01)
*H04L 29/06* (2006.01)
*H04L 29/08* (2006.01)
*H04L 12/24* (2006.01)

(52) U.S. Cl.
CPC ........ *H04L 61/103* (2013.01); *H04L 63/0428* (2013.01); *H04L 67/02* (2013.01); *H04L 67/10* (2013.01); *H04L 41/0803* (2013.01); *H04L 63/083* (2013.01)

(58) Field of Classification Search
None
See application file for complete search history.

(56) References Cited

U.S. PATENT DOCUMENTS

| | | | | |
|---|---|---|---|---|
| 5,430,850 A | * | 7/1995 | Papadopoulos | G06F 9/3851 719/314 |
| 5,915,025 A | * | 6/1999 | Taguchi | G06F 12/145 380/44 |
| 6,049,808 A | * | 4/2000 | Talluri | G06F 12/0284 |
| 10,454,845 B2 | * | 10/2019 | Medovich | H04L 61/2503 |
| 2002/0038371 A1 | * | 3/2002 | Spacey | H04L 63/0272 709/227 |

(Continued)

OTHER PUBLICATIONS https://web.archive.org/web/20150309023150/https://en.wikipedia.org/wiki/Access_token Wikipedia, Access Token; Mar. 9, 2015 (Year: 2015).*

*Primary Examiner* — Nasser M Goodarzi
*Assistant Examiner* — Terrika Peterson
(74) *Attorney, Agent, or Firm* — Barry Choobin; Patent 360 LLC

(57) ABSTRACT

Techniques to facilitate enhanced addressing of local and network resources from a computing system are provided herein. In one implementation, a method of mapping a virtual address space for an application on a computing system includes in response to initiating the application, identifying access information for at least one configuration resource. The method further includes transferring a request to the at least one configuration resource for a virtual addressing configuration, and receiving the virtual addressing configuration from the at least one configuration resource. The method further provides, based on the virtual addressing configuration, generating a mapping of virtual addresses for the application to local addresses for local resources and network addresses and network addresses for network resources.

14 Claims, 7 Drawing Sheets

(56) References Cited

U.S. PATENT DOCUMENTS

| | | | | |
|---|---|---|---|---|
| 2007/0171921 A1* | 7/2007 | Wookey | ............... | G06F 3/1415 |
| | | | | 370/401 |
| 2011/0082941 A1* | 4/2011 | Kim | ................... | H04L 12/2859 |
| | | | | 709/227 |
| 2013/0315243 A1* | 11/2013 | Huang | ................. | H04L 45/741 |
| | | | | 370/392 |
| 2015/0195196 A1* | 7/2015 | Patel | ...................... | H04L 45/74 |
| | | | | 370/392 |
| 2015/0378641 A1* | 12/2015 | Franke | ................ | G06F 3/0664 |
| | | | | 710/74 |
| 2016/0314067 A1* | 10/2016 | Medovich | ........... | G06F 12/1009 |
| 2016/0314079 A1* | 10/2016 | Medovich | ........... | G06F 12/1072 |
| 2017/0093623 A1* | 3/2017 | Zheng | ...................... | H04L 9/32 |
| 2017/0171187 A1* | 6/2017 | Yin | ...................... | H04L 63/083 |

\* cited by examiner

DYNAMIC CREDENTIAL BASED ADDRESSING

RELATED APPLICATIONS

This application claims the benefit of, and priority to, U.S. Provisional Patent Application No. 62/355,415, entitled "DYNAMIC CREDENTIAL BASED ADDRESSING", filed Jun. 28, 2016, which is hereby incorporated by reference in its entirety for all purposes.

TECHNICAL FIELD

Aspects of the disclosure are related to computing hardware and software technology, and in particular to computer architecture, cloud computing, and virtualization technology.

TECHNICAL BACKGROUND

In many organizations, end users are allocated computing resources based on tasks and/or requirements of each of the individual users. These resources may include storage resources, virtual machine resources, processing resources, applications, or any other similar type of computing resource. To provide the computing resources, an organization may employ information technology (IT) personnel that manage and configure the various devices for each of the end users. This configuring of devices may include installing software and applications on the devices, installing hardware on the devices, and providing security mechanisms, such as firewalls and antivirus software, to ensure security on the organizations network.

However, as the number of devices and the number of users increase in an organization's network, it often becomes difficult to manage the hardware and software for each of the individual users. Tasks, such as updating applications on the devices, may take an undesirable amount of time, and cause undue burden on the administrators of the network.

Further, some organizations may prefer to let end users within the organization bring their own devices such as smartphones, tablets, and computers. The organization then may provide the users with the required software and applications to be installed on the device. Although permitting users to bring their own devices allows users to use a device that they are comfortable with, it may be difficult for the organization to ensure security in the applications. Further, it may be difficult and cumbersome to provide the various applications and resources to the individual users of the organization.

Overview

Provided herein are systems, methods, and software to enhance addressing of local and network resources for a computing system. In one implementation, a method of mapping a virtual address space for an application on a computing system includes, in response to initiating the application, identifying access information for at least one configuration resource. The method further provides transferring a request to the at least one configuration resource for a virtual addressing configuration, and receiving the virtual addressing configuration from the at least one configuration resource. The method also includes, based on the virtual addressing configuration, generating a mapping of virtual addresses for the application on the computing system to local addresses that address local resources of the computing system and network addresses that address network resources external to the computing system over at least a network.

In some implementations, the network addresses comprise Uniform Resource Identifiers (URIs).

In some implementations, the local resources comprise disk storage and dynamic random-access memory (DRAM).

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
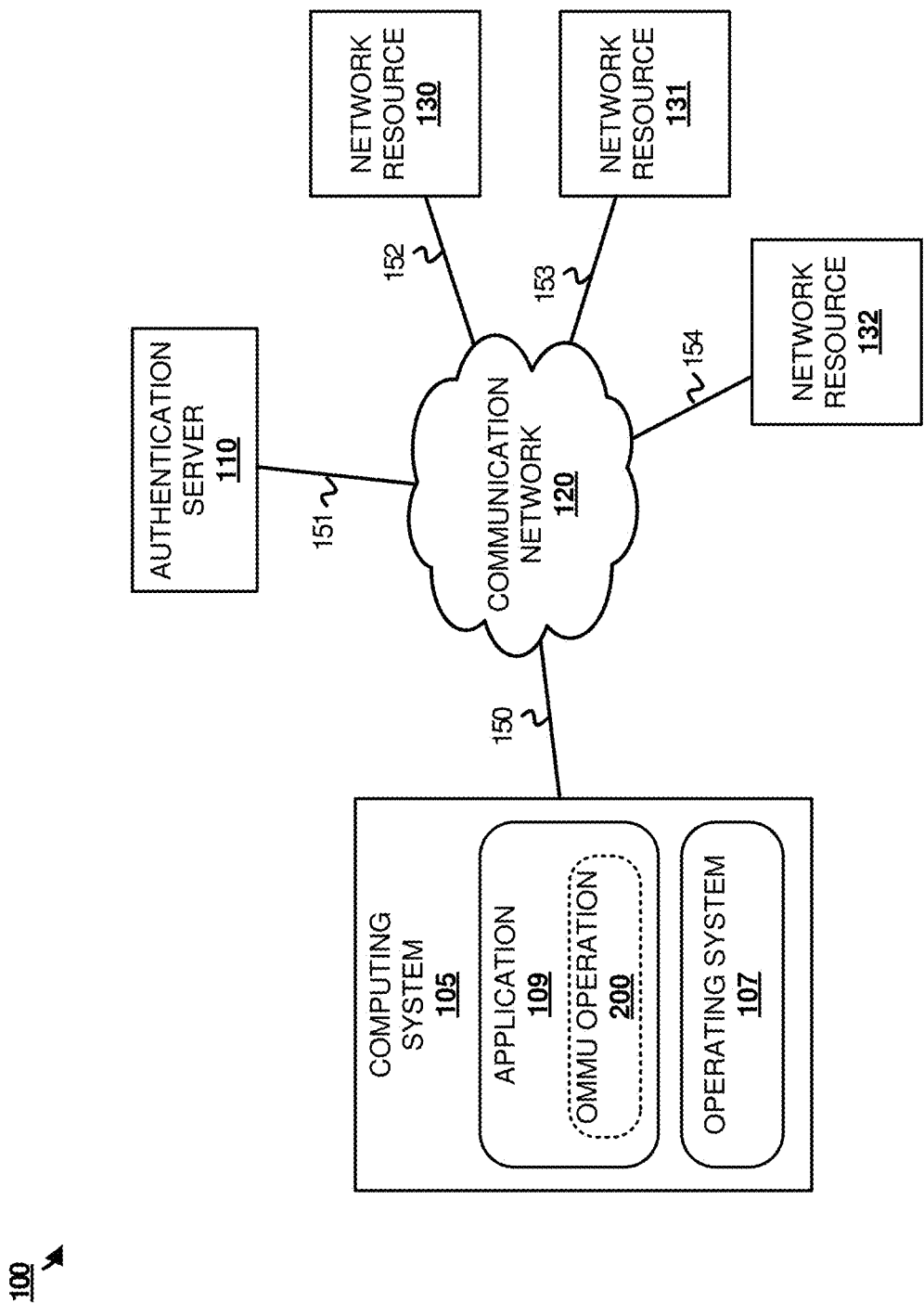
FIG. 1 illustrates a communication network for generating a virtual address mapping according to one implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The following discussion presents techniques to federate or unify a plurality of physical and virtual compute, storage, and Internet resources and make them available as a local resource in an application of a computing system. The techniques provide on-demand deployment and presentation of a compute resource that incorporates discrete physical and virtual compute, storage, and Internet resources available both locally or in the cloud as a unified local compute resource to a user.

In some examples, a computing system may be configured with a plurality of applications that provide various functions, including email, web browsing, file sharing, or any other similar application. Here, an application may be included that can dynamically configure an addressing space to include both local resources, such as dynamic random access memory (DRAM), solid state storage, disk storage, and like, as well as network resources, such as servers that can be addressed using HTTPS commands and universal resource identifiers (URI). In a particular example, a user may initiate execution of the application and provide credentials, such as a username and password. Once the credentials are provided, the computing system may transfer the credentials to an authentication server, which will determine what resources are provided to the user. After determining resources for the user, the authentication server may provide access information for at least one configuration resource. This access information may include one or more URIs, access keys, or any other similar access information to retrieve an addressing configuration from the at least one configuration resource.

Once the access information is obtained by the computing system, the computing system may transfer a request to the at least one configuration resource using the access information. In response to the request, the at least one configuration resource may transfer an addressing configuration to the computing system, wherein the addressing configuration is used to generate a mapping of virtual addresses in the computing system to local addresses that address local resources of the computing system and network addresses that address network resources external to the computing system over at least a network. This mapping expands the addressing space, such that data on external resources (such as servers and virtual machines) can be accessed in a similar manner as data that is stored locally on the device. For example, rather than installing the data locally, the computing system may use virtual addressing that maps to URIs to retrieve data from the networked resource and act on the data is if the data were stored locally on the computing system.

In many implementations, by dynamically configuring the addressing for specific users, administrators of an organizations network may more efficiently configure the required resources for end user devices. For example, a first set of users within the organization may be provided with a first set of resources, such as applications and storage, whereas a second group of users may be provided with a second set of resources. Accordingly, by managing the user credentials and supplying the users with addressing information (IP address, URI, etc.) for the authentication server. Each of the devices within the network may query the authentication server and be directed to a corresponding network configuration resource to supply the necessary resources for the user of the end computing system.

Referring now to FIG. 1, FIG. 1 illustrates a communication network 100 for generating a virtual address mapping according to one implementation. Communication network 100 includes computing system 105, authentication server 110, communication network 120, and network resources 130-132. Authentication server 110 and network resources 130-132 may each comprise physical host computing systems, virtual machines, containers, or some combination thereof. Network resources 130-132 are examples of resources capable of providing configuration information for addressing on computing system 105. Computing system 105, authentication server 110, and network resources 130-132 communicate with communication network 120 via communication links 150-154.

In operation, application 109, which includes OMMU operation 200, executes on computing system 105 with operating system 107. Operating system 107 may represent a desktop operating system such as Microsoft Windows, Apple OSX, Linux, or some other similar desktop operating system, or may represent a mobile operating system, such as Google's Android, Apple iOS, or some other similar mobile operating system. To provide the desired functionality for the end user of computing system 105, OMMU operation 200 is used to configure the addressing space for the application 109. In particular, OMMU operation 200 is used to identify credentials for the user of computing system 105, request addressing configuration information based on the credentials, and generate a mapping between virtual addresses for computing system 105 to local addresses and network addresses.

In generating the mapping, the user of computing system 105 may be provided with applications and services without installing all of the data for the applications and services locally on the computing system. Rather, once generated, computing system 105 may use the virtual addresses to access data over communication network 120 for processing locally on the computing system. For example, if the user of computing system 105 were associated with a particular virtual machine, rather than installing or storing the data required for the virtual machine locally on the device, the mapping may be used to retrieve and execute the required data for the virtual machine.

Figure 2:
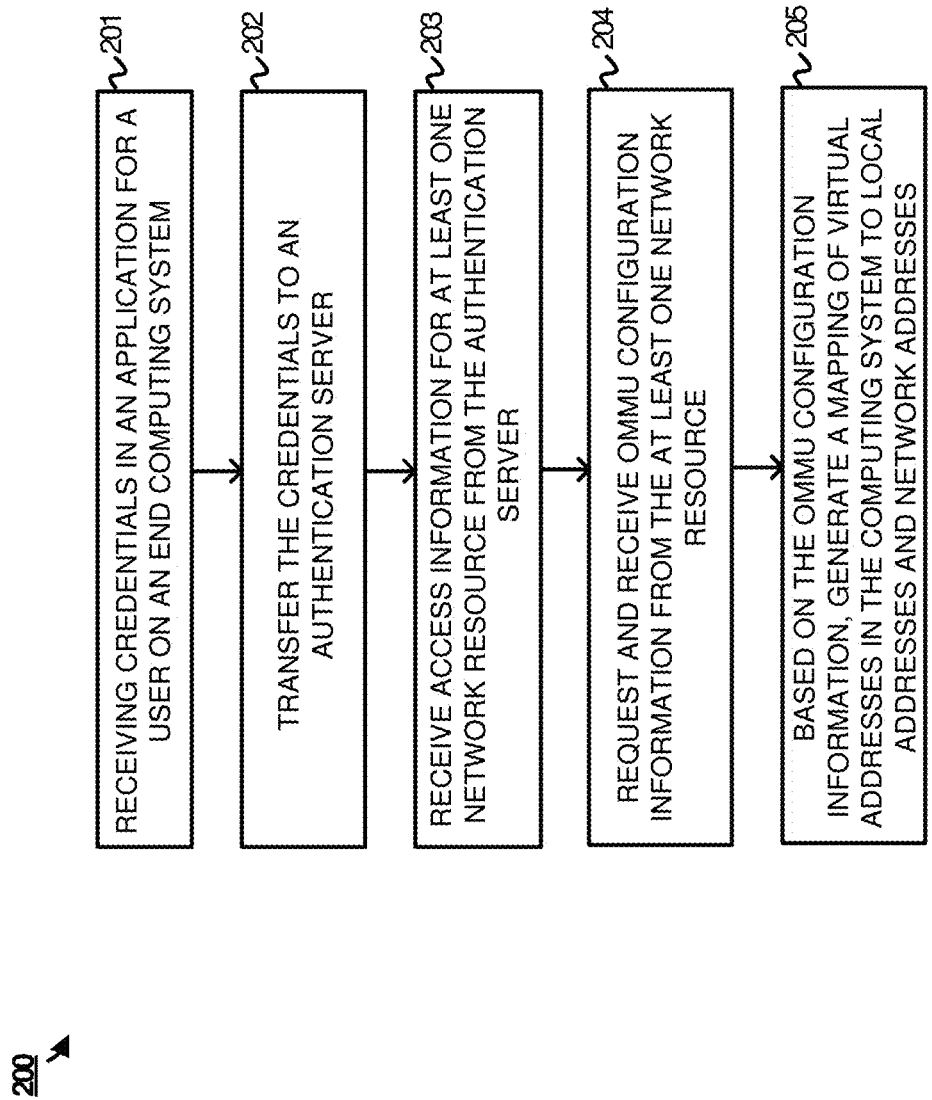
FIG. 2 illustrates an operation of generating a virtual address mapping according to one implementation.

To further demonstrate the configuration of computing system 105, FIG. 2 is provided. FIG. 2 illustrates an operation 200 of generating a virtual address mapping according to one implementation. The processes of operation 200 are referenced parenthetically in the paragraphs that follow, along with references to the elements and systems from communication system 100 of FIG. 1.

As depicted, operation 200 includes receiving credentials in application 109 for a user on an end user computing system 105 (201). To receive the credentials, the user may initiate execution of the application, and the application may provide the user with an interface to supply credentials, such as a username and password. Once displayed, the end user may enter the required credentials, and computing system 105 may transfer the credentials to authentication server 110 over communication network 120 (202). Authentication server 110 identifies access information for network resources or configuration resources associated with the provided credentials, and transfers that access information to computing system 105. In some implementations, application 109 and OMMU operation 200 may be provided with addressing information for authentication server 110, such as an IP address or a URI, permitting the computing system 105 to communicate the required credentials.

Once the access information is transferred by authentication server 110, computing system 105 receives the access information for the at least one network resource from authentication server 110 (203), and requests and receives OMMU configuration information from the at least one network resource (204). For example, if computing system 105 and the associated user were to be configured by network resource 130, authentication server 110 may provide application 109 with access information for network resource 130. This access information may include IP address information for network resource 130, URI information for network resource 130, security credentials for network resource 130, or any other similar access information for network resource 130. Based on the provided credentials, OMMU operation 200 may exchange communications with network resource 130 to retrieve an addressing configuration for application 109.

Based on the received OMMU configuration information from the at least one network resource, computing system 105 generates a mapping of virtual addresses for computing system 105 to local addresses and network addresses (205). In particular, computing system 105 generates a mapping of virtual addresses for application 109 in the computing system to local addresses that address local resources of the computing system and network addresses that address network resources external to the computing system over at least a network. These local and network resources may provide one or more applications assigned to the end user, may provide virtual machines assigned to the end user, or may provide any other similar operation or process capable of being assigned to the end user. For example, if the user were to be allocated a suite of productivity applications. Rather than installing the applications locally, a OMMU configuration may be provided the user permitting the user to execute the productivity applications within application 109. To execute the applications, at least a portion of the virtual addresses may be mapped to network resources, such as URIs, wherein computing system 105 may retrieve data from the URIs and perform operations on the data as if the data were available on local storage.

In some implementations, in addition to configuring the addressing for application 109, the configuration network resources provided to computing system 105 may further provide data to be stored locally on computing system 105. Referring to the productivity suite example, in some implementations, network resources 130-132 may provide at least a portion of the application data to be stored locally on computing system 105. Consequently, when generating the mapping, the virtual addresses may be mapped to local storage resources that include the data provided by the network resources, and may further be mapped to network resources, such that data can be retrieved (often using HTTPS commands) and processed as required from the network resources.

In some examples, the user may be required to provide the credentials each time that application 109 is initiated on the device. However, in other implementations, once authorized, application 109 may use the access information provided from authentication server 110 to request the mapping on the computing system 105. Further, in some implementations, each time that application 109 is initiated, application 109 may retrieve mapping configuration information from the available network resources. In other implementations, rather than retrieving the mapping configuration on each execution instance, the mapping may be maintained locally, such that a new mapping configuration is not required on each execution of the application. This local mapping may be updated at defined intervals, such as each day when application 109 is executed, each hour when application 109 is executed, or any other similar interval.

In some implementations, authentication server 110 may be used to revoke or provide additional resources to application 109 on computing system 105. For example, the user of application 109 may be initially provided with a first mapping configuration, however, at a later time, the user may be provided with a second mapping configuration. As a result, authentication server 110 may push different access credentials to computing system 105 to change the addressing configuration on the device. This push may come when application 109 transfers a request to authentication server 110, or may come without a request from application 109.

Although illustrated in the previous implementation as requiring the user to provide credentials to authentication server 110, it should be understood that in some examples, in addition to or in place of the user credentials, device credentials may be used in authorizing or authenticating the user. These device credentials may include a media access control (MAC) address for the device, a device name, or some other identifier for the device, including combinations thereof. This identifier may be used by authentication server 110 to determine whether computing system 105 is approved to receive specific resources. For example, an organization may maintain identifier information for devices belonging to end users of the organization. Consequently, only approved end user devices of the organization may receive access information for network resources.

Figure 3:
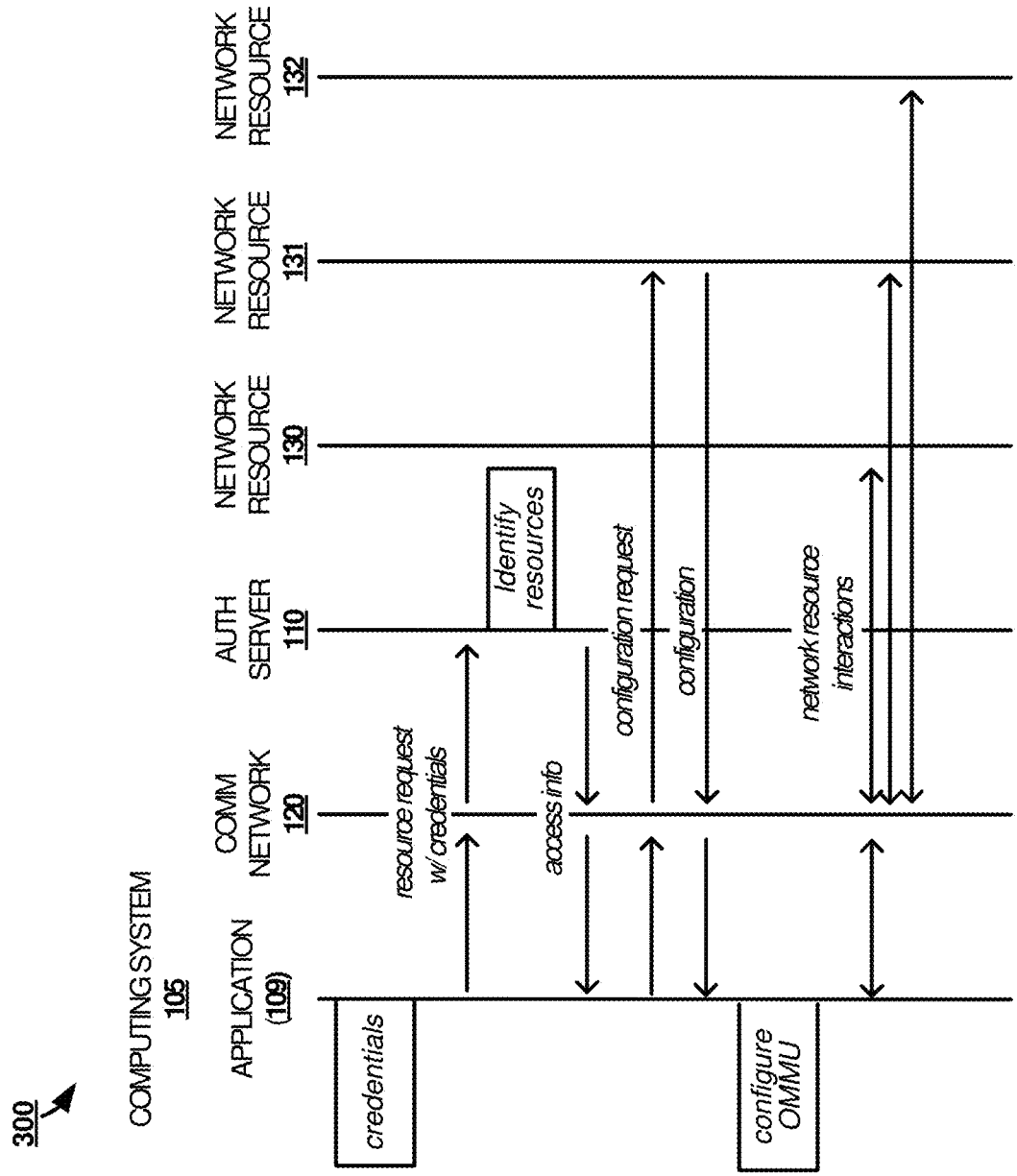
FIG. 3 illustrates a timing diagram of generating a virtual address mapping for an application according to one implementation.

FIG. 3 illustrates a timing diagram 300 of generating a virtual address mapping for an application according to one implementation. Timing diagram 300 is described in the paragraphs that follow with references to the elements and systems from communication system 100 of FIG. 1.

As illustrated in FIG. 3, application 109 on computing system 105 identifies credentials associated with the end user of the device, and transfers the credentials with a resource request to authentication server 110 over communication network 120. In response to receiving the request, authentication server 110 determines resources for the computing system 105 based on the credentials, and transfers access information for the resources to application 109 on computing system 105. Here, the access information includes information for application 109 to communicate with network resource 131 for a mapping configuration, wherein the access information may include addressing information for network resource 131, credentials for network resource 131, or any other required information to retrieve a mapping configuration from network resource 131.

After the access information is received by application 109, application 109 transfers a configuration request to network resource 131 and receives a mapping configuration from the network resource. This mapping configuration is used to generate a mapping of virtual addresses for the application to local addresses that address local resources and network addresses that address network resources over communication network 120. In some implementations, the configuration of the OMMU may include the configuration of one or more object tables which can associate virtual addresses to local addresses and network addresses.

Once the mapping is generated based on the configuration information from network resource 131, application 109 executes using the virtual address mapping. As depicted in timing diagram 300, once the object memory management unit is configured for the application, the mapping may be used to interact and retrieve required data from network resources 130-132. This data may include program instructions, data objects, such as images, videos, text files, and the like, or some other similar data.

In some implementations, in addition to retrieving the configuration to map the virtual addresses to local and network addresses, application 109 may also retrieve data to be locally stored on computing system 105. This data may include program instructions and other similar data objects for processing by computing system 105. For example, if the user of computing system 105 were to be allocated a virtual machine, at least a portion of the data required for executing the virtual machine may be retrieved from network resource 131 and stored in a local resource, such as DRAM, solid state storage, hard disk storage, or the like. This portion of the data may include the most frequently used portions for the virtual machine, or any other similar data for the operation of the virtual machine.

Figure 4:
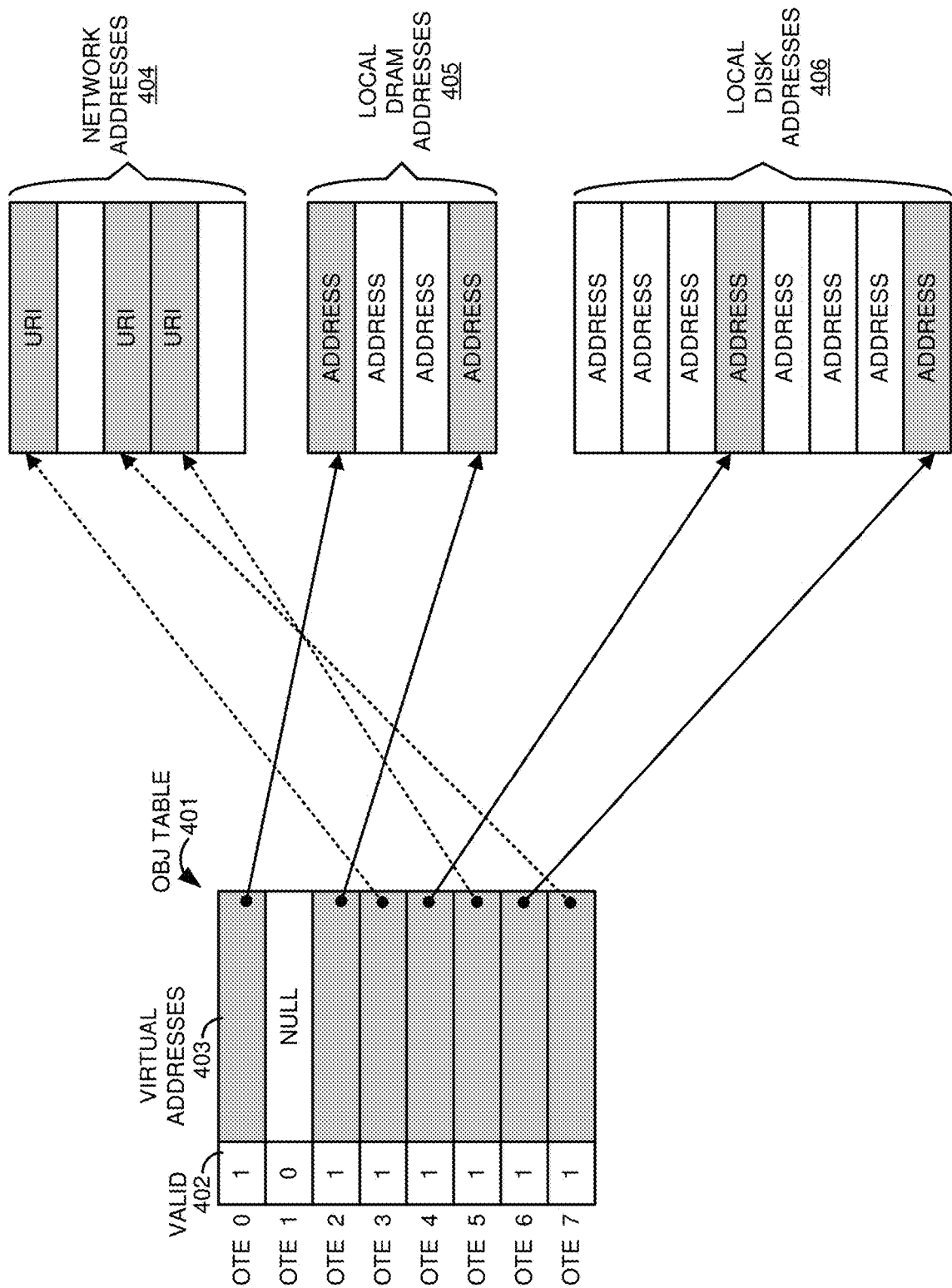
FIG. 4 illustrates address mapping for an application according to one implementation.

FIG. 4 illustrates address mapping for an application according to one implementation. FIG. 4 includes object table 401, which is used to map virtual addresses 403 to network addresses 404, local DRAM addresses 405, and local disk addresses 406. Object table 401 further includes a validity bit 402 for each of the addresses within the table.

As described herein, at least one application on a computing system may communicate with an authentication server and one or more network resources to identify an address mapping scheme for an application. This address mapping scheme permits the application to use network resources, accessible using a URI in the same manner that resources would be gathered from local resources such as DRAM or disk storage. Here, object able 401 is representative of a table that may be used by an OMMU operation in the application to direct appropriate addressing requests to their physical storage destination. For example, when the application requires access to the virtual address at OTE 0, object table 401 may be used to map the virtual address to an address in local DRAM addresses 405. In contrast, if the application requested OTE 5, then the same object table may be used, at least in part, to direct the communication to network addresses 404.

In some implementations, in receiving the configuration for the OMMU for an application, the OMMU may initiate an operation of the application using the provided addresses. For example, referring to object table 401, once the object table is configured for the OMMU operation, the configuration may direct the OMMU to initiate execution of the application at one of the configured virtual addresses in virtual addresses 403. After being initiated, data may be retrieved based on the program instructions from network addresses 404, local DRAM addresses 405, and local disk addresses 406.

In some implementations, virtual addresses 403 comprise 32-bit or 64-bit address spaces depending on the processor and hardware configuration of the computing system the application is operating thereon. However, it should be understood that virtual addresses 403 may operate in any sized address space. In the example of a 64-bit addressing space, a request may be generated for the application to retrieve an object at a particular 64-bit address. In response to the request, the OMMU operation for the application may translate the request into the appropriate end destination, either local or network, and access the required data. In some examples, in the situation where the data is not cached in DRAM or other local memory for the computing system, the OMMU operation may be used to cache the requested data in memory to make the data more readily accessible for the next request. However, it should be understood that in some examples, the data may not be cached in local memory, and may instead require retrieval from the secondary storage media, either local or over the network. For example, if a request was generated for data at a URI in network addresses 404, then the data may be retrieved from the URI without caching the data in local memory for the computing system.

In some implementations, to retrieve data from URIs in network addresses 404, the OMMU operation may be configured to use Hypertext Transfer Protocol Secure (HTTPS) commands to access the required data. These commands may include, but are not limited to, GET, PUT, POST, and DELETE to provide the appropriate operation with respect to the application. For example, referring to the URI mapped to OTE 3 of object table 401. When a request is generated to retrieve data at the virtual address associated with OTE 3, object table 401 is used to translate the request to the appropriate URI, and the OMMU operation translates the retrieval request into a HTTPS GET request to retrieve the data at the particular URI.

Although illustrated in the example of FIG. 4 as using object table 401 to match virtual addresses 404 to their corresponding network and local addresses, it should be understood that the object tables used by a OMMU operation may maintain other information related to accessing the data. This other information may include credentials and security keys to access data at each of the addresses. Consequently, if a request were identified for the virtual address associated with OTE 5, then the OMMU operation may use an object table to translate the request to the appropriate URI in network addresses 404 and may further identify the required credentials to access the data. For example, a security token or key may be required when a request is generated for the particular network resource. If the improper key is provided, then the network resource at the URI may prevent any data from being retrieved. However, if the computing system provides the proper access credentials or key, then the network resource may provide the data at the URI. Additionally, credentials and/or keys may be associated with at least a portion of virtual addresses 403, which can be used to encrypt/decrypt any data that is retrieved and sent to a URI. This permits any of the data for the application to be encrypted as it is transferred over a communication network.

In some implementations, in configuring the OMMU tables with the credentials, tokens, and encryption keys to access the various resources, the information may be provided with the OMMU configuration data from the configuration resources. In particular, with the access information provided by the authentication server, the application may retrieve the OMMU configuration from the network resource using the access information, and may further retrieve the credentials, tokens, encryption keys, and the like. Once retrieved, the mapping may be generated that associates virtual addresses to local and network addresses, and further maps virtual addresses to the required credentials, tokens, and the like.

Figure 5:
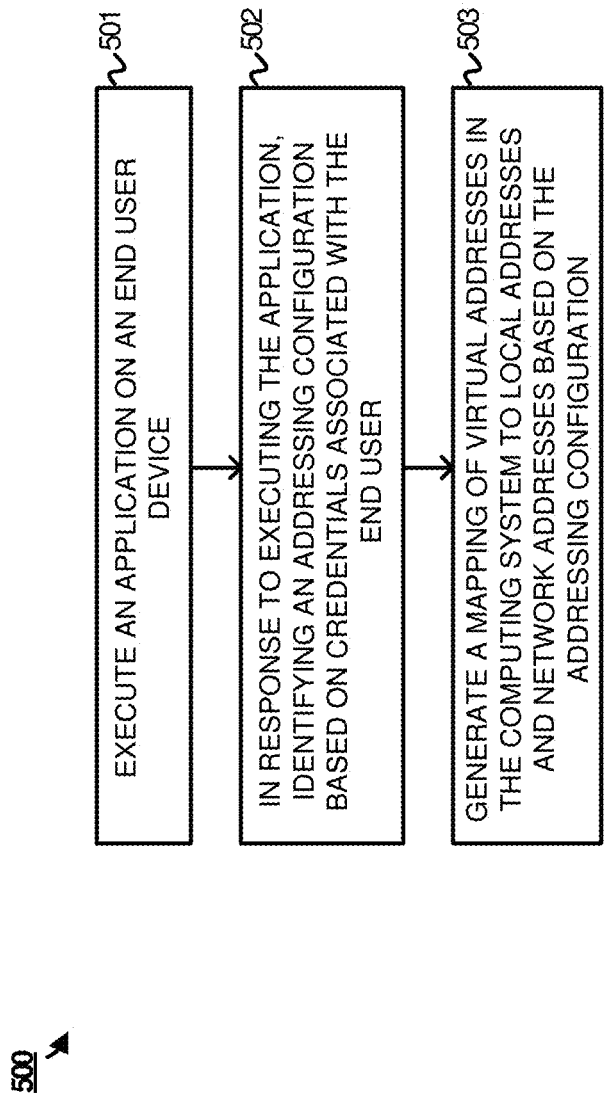
FIG. 5 illustrates a method of configuring an object memory management unit operation according to one implementation.

FIG. 5 illustrates a method 500 of configuring an object memory management unit operation according to one implementation. Method 500 is an example process to configure an OMMU operation for application 109 of FIG. 1, or some other application capable of execution on a computing system.

As illustrated, method 500 includes executing an application on an end user device (501). In response to executing the application, the method further provides identifying an addressing configuration based on credentials associated with the end user (502). In some implementations, to identify the addressing configuration, the application may provide user and/or device identifier information to an authentication server. In response to providing the identifier information, the authentication server may provide the computing system with access information for a configuration network resource. Based on the access information, the computing system may retrieve an addressing configuration from the configuration network resource. For example, the authentication server may provide the computing system with a URI and security credentials to retrieve a configuration for the OMMU process for the application.

In other implementations, the application may cache access information for the network configuration resource. Accordingly, rather than requesting and receiving the access information from the authentication server, the application may use the cached information to retrieve the addressing configuration.

Once the addressing configuration is received, the method further provides for generating a mapping of virtual addresses in the computing system to local addresses and network addresses based on the addressing configuration (503). This addressing configuration permits the application to use both local resources, such as DRAM and disk drives of the device, in combination with network resources that are accessible via URIs. In particular, it permits the application to access data using a single virtual address space that can be translated into the required format for the local or network resource. For example, the application may provide a request for a page at a first virtual address that is translated into a local address to retrieve the requested page. Later, the application may provide a second request for a second page at a second virtual address that is translated into a URI to access the required data from a resource over a communication network.

In some implementations, in retrieving data that is not cached in memory for the computing system, the OMMU operation may be configured to permit the caching of data in local memory for the computing system. This caching may occur with data that is most frequently used, frequently accessed, or the like.

In some implementations, in addition to retrieving the configuration for the OMMU operation, the configuration resource may also provide data for the application to be stored locally on the device. This local data may include data that is most frequently used, data that is often required to be accessed quickly, or any other similar data. Once the data is stored, the OMMU operation may include the locally stored data, such that the virtual addresses address map to local addresses for the locally stored data, and any remaining data is accessible via network addresses over the communication network.

Figure 6:
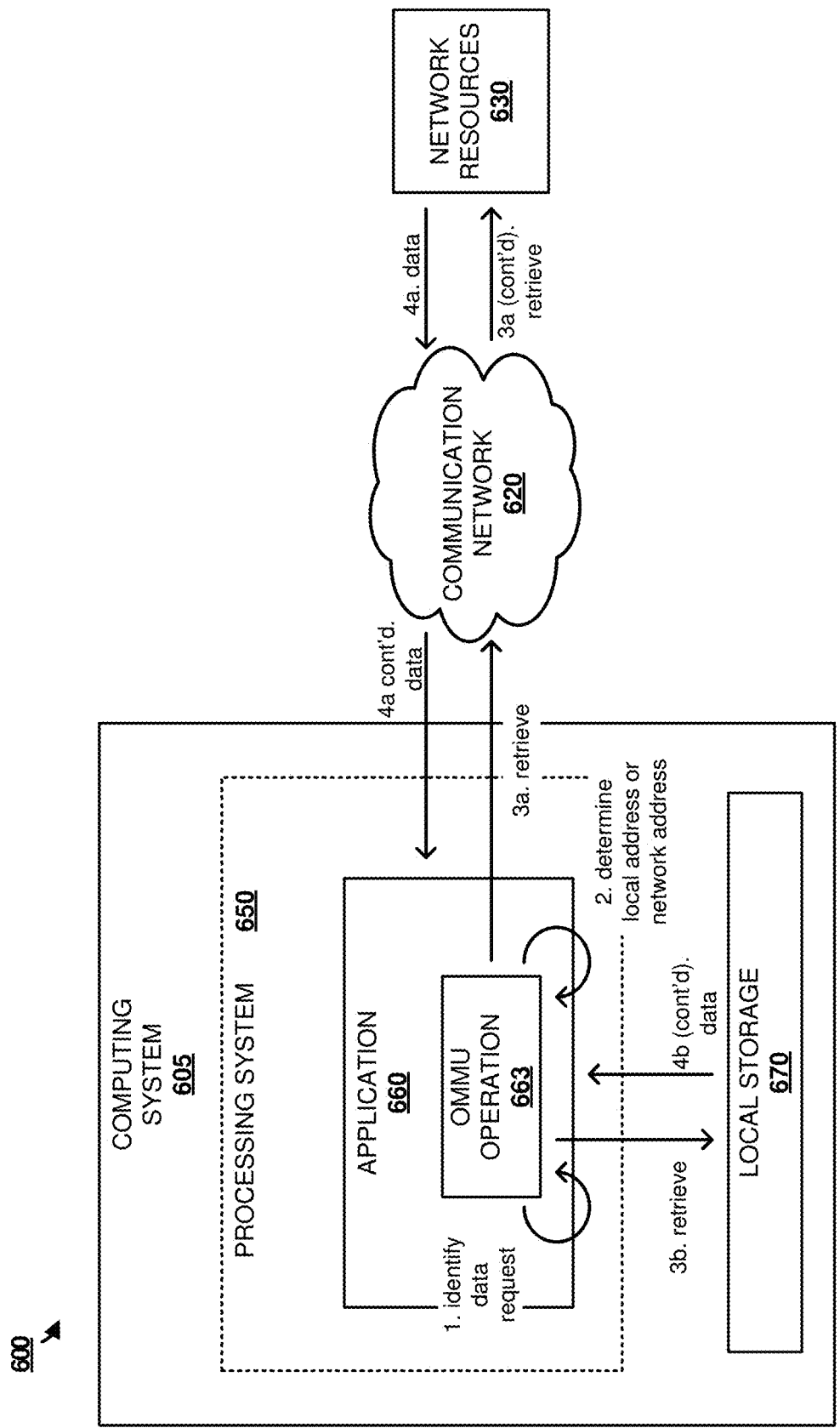
FIG. 6 illustrates an operational scenario of accessing local and network addresses according to one implementation.

FIG. 6 illustrates an operational scenario 600 of accessing local and network addresses according to one implementation. Operational scenario 600 includes computing system 605, communication network 620, and network resources 630. Computing system 605 includes processing system 650 configured operate application 660 with OMMU operation 663, and further includes local storage 670.

In the present example of operational scenario 600, OMMU operation 663 on application 660 has been configured with address mapping as described herein. This address mapping, which is provided from a configuration network resource, permits the application to access and store data locally using the same addressing space as data that is stored on network resources accessible over network 620. For example, the virtual addressing space may comprise a 64-bit addressing space that can be translated into local addresses to address data that is stored on local storage 670, as well as network addresses to address data that are capable of addressing resources (such as data pages) located on resources over communication network 620.

Here, at step 1, OMMU operation 663, which is executing as part of application 660 identifies a data request for application 660. In response to identifying the request, OMMU operation 663, at step 2, determines a local address or a network address for the request based on the configured mapping for OMMU operation 663. In particular, OMMU operation 663 may maintain one or more tables, arrays, or other data structures to translate requests with virtual addresses to local or network addresses.

In the first example, for a network retrieval represented by steps with the letter "a," OMMU operation 663 identifies that the request is directed at a network address, such as a URI. In response to this identification, at step 3*a*, OMMU operation 663 initiates a retrieval process over communication network 620 to network resources 630. In response to the request, the resource at the desired URI may identify the required data and provide, at step 4*a*, the data over communication network 620 to application 660. In some implementations, to access the data, the virtual address may be further associated with various credentials, such as encryption keys, tokens, and the like. As a result, when the retrieval is initiated by OMMU operation 663, the operation may provide the token, or exchange security parameters with the network resource to authorize the retrieval of the data. Further, an encryption key may be used decrypt any of the data that is retrieved from the resource.

In the second example, for a local retrieval represented by steps with the letter "b," OMMU operation 663 identifies that the request is directed at a local address for local storage 670. In response to the identification, at step 3*b*, OMMU operation 663 initiates a retrieval process to retrieve the data from local storage 670, wherein the data is provided to application 660, at step 4*b*. This local storage 670 may comprise DRAM, solid state storage, disk storage, or some other similar storage that is not accessible over communication network 620.

In some implementations, local storage 670 may also be used to cache data from network resources 630. For example, if a data request required a data page from network resources, the page may be retrieved and cached locally in local storage 670, permitting local access to the data.

Although illustrated in the example of operational scenario 600 with retrieving data from local storage 670 and network resources 630, it should be understood that similar operations may be applied to writing, copying, deleting, or any other similar access operation with respect to the data.

Figure 7:
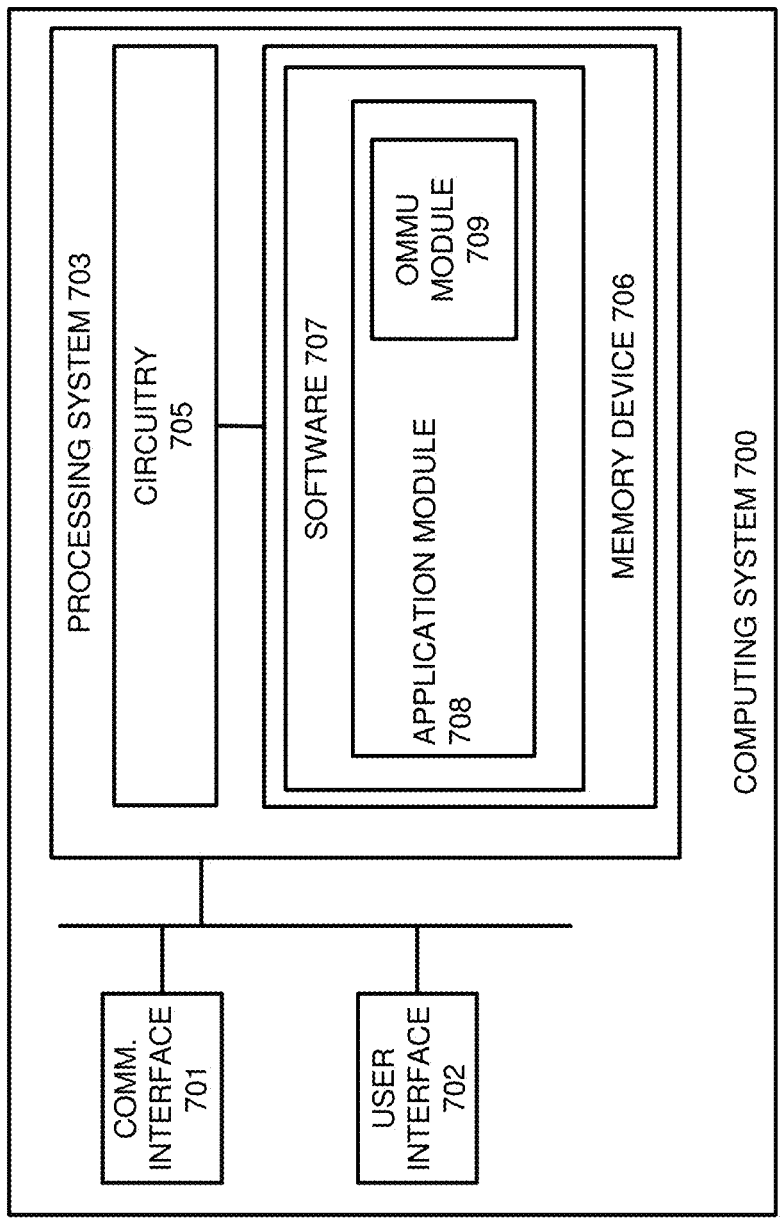
FIG. 7 illustrates a computing system capable of configuring a virtual addressing space according to one implementation.

FIG. 7 illustrates a computing system 700 capable of configuring a virtual addressing space according to one implementation. Computing system 700 is representative of any computing system or systems with which the various operational architectures, processes, scenarios, and sequences disclosed herein for generating address mapping may be implemented. Computing system 700 is an example of computing system 105 and 605, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise a user device, subscriber equipment, customer equipment, access terminal, smartphone, personal digital assistant (PDA), computer, tablet computing device, e-book, Internet appliance, media player, game console, or some other user communication apparatus.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to communicate with network resources that can be used to configure and provide data resources for an application executing on computing system 700. Further, communication interface 701 may be configured to provide communications with an authentication server capable of checking credentials for a user and/or the computing system, and providing access information for configuration resources.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes application 708 with OMMU module 709, although any number of software modules within the application may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, when application 708 is initiated on processing system 703, OMMU module 709 is triggered to configure an address mapping for the application. To provide the address mapping, OMMU module 709, when read and executed by processing system 703, directs processing system 703 to identify access information for one or more configuration resources to configure the address mapping. In one example, to identify the access credentials, OMMU module 709 may receive credentials from an end user of computing system 700, transfer the credentials to an authentication server via communication interface 701, and receive access information corresponding to configuration resources available to the end user. In other implementations, access information may be locally cached on computing system 700. This local access information may comprise access information previously received from the authentication server, access information that was configured when the application was unpacked and installed on the device, or some other cached access information.

Once the access information is obtained, OMMU module 709 directs processing system 703 to retrieve an addressing configuration information from at least one network resource over communication interface 701. Once the configuration is received and, in some cases, cached on computing system 700, OMMU module 709 directs processing system 703 to, based on the addressing configuration, generate a mapping of virtual addresses in the computing system to local addresses that address local resources of the computing system and network resources that address network resources external to the computing system over at least a communication network. This addressing configuration permits the application to use virtual addresses, such as addresses within a 64-bit addressing space, which can be routed to both local resources, and external resources accessible using URIs. Consequently, rather than having all of the data stored locally on the device for execution, OMMU module 709 permits portions of the data to be stored in network resources. In some implementations, the addressing configuration may provide the user with a single application, such as a word processing application. In other implementations, the addressing configuration may provide the user with multiple applications, one or more virtual machines, or some other application or process capable of being executed via processing system 703.

In some implementations, in addition to the addressing configuration, the configuration resources may supply computing system 700 with data that can be stored locally on the computing system. This data may include program instructions for the application, data for the application, or some other data related to the application. In some implementations, data for the application may previously have been stored on computing system 700 prior to retrieving the configuration. Accordingly, the mapping that is generated for the application may map to local resources that store data for the application.

Returning to the elements of FIG. 1, computing system 105 can be a user device, subscriber equipment, customer equipment, access terminal, smartphone, personal digital assistant (PDA), computer, tablet computing device, e-book, Internet appliance, media player, game console, or some other user communication apparatus. Computing system 105 can include communication interfaces, network interfaces, processing systems, computer systems, microprocessors, storage systems, storage media, or some other processing devices or software systems. In some implementations, computing system 105 may represent a virtual machine executing on a host computing system.

Authentication server 110 can include communication interfaces, network interfaces, processing systems, computer systems, microprocessors, storage systems, storage media, or some other processing devices or software systems, and can be distributed among multiple devices. Examples of authentication server 110 can include software such as an operating system, logs, databases, utilities, drivers, natural language processing software, networking software, and other software stored on a computer-readable medium. Authentication server 110 may comprise, in some examples, one or more server computing systems, desktop computing systems, laptop computing systems, or any other computing system, including combinations thereof.

Network resources 130-132 can each include communication interfaces, network interfaces, processing systems, computer systems, microprocessors, storage systems, storage media, or some other processing devices or software systems, and can be distributed among multiple devices. Examples of network resources 130-132 can include software such as an operating system, logs, databases, utilities, drivers, natural language processing software, networking software, and other software stored on a computer-readable medium. Network resources 130-132 may each comprise, in some examples, one or more server computing systems, desktop computing systems, laptop computing systems, or any other computing system, including combinations thereof. Network resources 130-132 may be configured to store addressing configurations for computing systems, and may further be configured to provide resources, such as storage resources, capable of being addressed by the end computing systems.

Communication network 120 may comprise switches, wireless access nodes, Internet routers, network gateways, application servers, computer systems, communication links, or some other type of communication equipment— including combinations thereof. Communication network is capable of providing communication services to computing system 105, authentication server 110, and network resources 130-132.

Communication links 150-154 each use metal, glass, optical, air, space, or some other material as the transport media. Communication links 150-154 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 150-154 can each be a direct link or can include intermediate networks, systems, or devices, and can include a logical network link transported over multiple physical links. Although one main link for each of links 150-154 is shown in FIG. 1, it should be understood that links 150-154 are merely illustrative to show communication modes or access pathways. In other examples, further links can be shown, with portions of the further links shared and used for different communication sessions or different content types, among other configurations. Communication links 150-154 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

What is claimed is:

1. A computer-implemented system having a processor installed therein, said processor configured to:

receive user credentials from a user having access to said computer-implemented system, process said access credentials, and identify, based on said user credentials, at least configuration resources and corresponding configuration information, wherein said configuration resources include at least one network resource accessible via a predetermined computer network and wherein said configuration information enables configuration and interfacing of said network resource with said computer-implemented system;

configure, based on said access information, said network resource to interface with said computer-implemented system;

selectively map virtual addresses pre-assigned to said computer-implemented system to local addresses pre-assigned to said computer-implemented system and to network addresses pre-assigned to said network resource interfaced with said computer-implemented system;

selectively assign encryption keys to each of said virtual addresses, such that each of said encryption keys, post mapping of said virtual addresses, said local addresses, and said network addresses, are assigned to a combination of said virtual addresses and said network addresses;

store in an object table, as correlated table entries, each of said encryption keys and said combination of said virtual addresses and said network addresses;

categorize access requests directed to said network addresses to be valid and allowable only if said requests incorporate a valid combination of virtual addresses and encryption keys corresponding to respective network addresses, in line with said correlated table entries on said object table; and wherein said processor is further configured to translate an access request incorporating at least one of said virtual addresses and at least one of said encryption keys into an access request directed to at least one of said network addresses, based on said mapping, only in an event said at least one encryption key incorporated into said request is determined to be equivalent to an encryption key stored on said object table against said at least one of said virtual addresses specified in said access request.

2. The system as claimed in claim 1, wherein said configuration information is selected from a group of information consisting of Internet Protocol (IP) address of said network resource, universal resource indicator (URI) of said network resource, and security credentials corresponding to said network resource.

3. The system as claimed in claim 1, wherein said user credentials include at least a username and a corresponding password.

4. The system as claimed in claim 1, wherein said processor is further configured to receive device credentials corresponding to said computer-implemented system, in addition to said user credentials, and wherein said device credentials are selected from the group of credentials consisting of media access control (MAC) address of said computer-implemented system, an identifier pre-assigned to said computer-implemented system, and a name pre-assigned to said computer-implemented system.

5. The system as claimed in claim 1, wherein said processor dynamically configures an address space installed within said computer-implemented system, such that:
  said addressing space includes a plurality of local storage resources accessible via said local addresses and programmatically linked to a plurality of virtual addresses, and to a plurality of network resources accessible via said network addresses; and
  data required to be processed by said computer-implemented system is stored in part in said local storage resources accessible via said local addresses, and in part in said network resources accessible via said network addresses, such that said data could be retrieved on said computer-implemented system from said local storage resources and said network resources based on said mapping.

6. The system as claimed in claim 1, wherein said processor retrieves, based on said mapping, data from a predetermined network address, and stores said data on a predetermined local address, only in an event said data is deemed to be used frequently by said computer-implemented system, and wherein said processor is further configured to render said data locally accessible to said computer-implemented system based on said mapping between said virtual addresses, said local storage addresses, and said network addresses.

7. A computer-implemented method executed on a computer-implemented system installed with a processor, said computer-implemented method when executed by said processor, causes the processor to:
  receive user credentials from a user having access to said computer-implemented system;
  process said access credentials, and identify, based on said user credentials, at least configuration resources and corresponding configuration information, wherein said configuration resources include at least one network resource accessible via a predetermined computer network and wherein said configuration information enables configuration and interfacing of said network resource with said computer-implemented system;
  configure, based on said access information, said network resource to interface with said computer-implemented system;
  selectively map virtual addresses pre-assigned to said computer-implemented system to local addresses pre-assigned to said computer-implemented system and to network addresses pre-assigned to said network resource interfaced with said computer-implemented system;
  selectively assign encryption keys to each of said virtual addresses, such that each of said encryption keys, post mapping of said virtual addresses, said local addresses, and said network addresses, are assigned to a combination of said virtual addresses and said network addresses;
  store in an object table, as correlated table entries, each of said encryption keys and said combination of said virtual addresses and said network addresses;
  categorize access requests directed to said network addresses to be valid and allowable only if said requests incorporate a valid combination of virtual addresses and encryption keys corresponding to respective network addresses, in line with said correlated table entries on said object table;
  translate an access request incorporating at least one of said virtual addresses and at least one of said encryption keys into an access request directed to at least one of said network addresses, based on said mapping, only in an event said at least one encryption key incorporated into said request is determined to be equivalent to an encryption key stored on said object table against said at least one of said virtual addresses specified in said access request.

8. The method as claimed in claim 7, wherein the step of causing said processor to receive user credentials, further includes the step of causing said processor to receive device credentials in addition to said user credentials, and wherein credentials are selected from the group of credentials consisting of media access control (MAC) address of said computer-implemented system, an identifier pre-assigned to said computer-implemented system, and a name pre-assigned to said computer-implemented system.

9. The method as claimed in claim 7, wherein the step of causing the processor to identify configuration information, further includes the step of causing the processor to identify at least one of Internet Protocol (IP) address of said network resource, universal resource indicator (URI) of said network resource, and security credentials corresponding to said network resource.

10. The method as claimed in claim 7, wherein the step of causing the processor to receive user credentials, further includes the step of causing the processor to receive at least a username and a password.

11. The method as claimed in claim 7, wherein the method further includes the step of dynamically configures an address space installed within said computer-implemented system, such that:
  said addressing space includes a plurality of local storage resources accessible via said local addresses and programmatically linked to a plurality of virtual addresses, and to a plurality of network resources accessible via said network addresses; and
  data required to be processed by said computer-implemented system is stored in part in said local storage resources accessible via said local addresses, and in part in said network resources accessible via said network addresses, such that said data could be retrieved on said computer-implemented system from said local storage resources and said network resources based on said mapping.

12. The method as claimed in claim 7, wherein the method further includes the step of retrieving, based on said mapping, data from a predetermined network address, and storing said data on a predetermined local address, only in an event said data is deemed to be used frequently by said computer-implemented system, and rendering said data locally accessible to said computer-implemented system based on said mapping between said virtual addresses, said local storage addresses, and said network addresses.

13. A non-transitory computer-readable storage medium having computer-readable program instructions stored thereon, said computer-readable instructions when executed by a processor installed within a computer-implemented system, cause the processor to:
  receive user credentials from a user having access to said computer-implemented system;
  process said access credentials, and identify, based on said user credentials, at least configuration resources and corresponding configuration information, wherein said configuration resources include at least one network resource accessible via a predetermined computer network and wherein said configuration information enables configuration and interfacing of said network resource with said computer-implemented system;

configure, based on said access information, said network resource to interface with said computer-implemented system;

selectively map virtual addresses pre-assigned to said computer-implemented system to local addresses pre-assigned to said computer-implemented system and to network addresses pre-assigned to said network resource interfaced with said computer-implemented system;

selectively assign encryption keys to each of said virtual addresses, such that each of said encryption keys, post mapping of said virtual addresses, said local addresses, and said network addresses, are assigned to a combination of said virtual addresses and said network addresses;

store in an object table, as correlated table entries, each of said encryption keys and said combination, of said virtual addresses and said network addresses;

categorize access requests directed to said network addresses to be valid and allowable only if said requests incorporate a valid combination of virtual addresses and encryption keys corresponding to respective network addresses, in line with said correlated table entries on said object table;

translate an access request incorporating at least one of said virtual addresses and at least one of said encryption keys into an access request directed to at least one of said network addresses, based on said mapping, only in an event said at least one encryption key incorporated into said request is determined to be equivalent to an encryption key stored on said object table against said at least one of said virtual addresses specified in said access request.

14. The computer-readable instructions as claimed in claim 13, wherein said computer-readable instructions when executed by said processor, cause the processor to:

receive device credentials in addition to said user credentials, and wherein credentials are selected from the group of credentials consisting of media access control (MAC) address of said computer-implemented system, an identifier pre-assigned to said computer-implemented system, and a name pre-assigned to said computer-implemented system;

identify at least one of Internet Protocol (IP) address of said network resource, universal resource indicator (URI) of said network resource, and security credentials corresponding to said network resource;

receive at least a username and a password, as user credentials;

dynamically configure an address space installed within said computer-implemented system, such that said addressing space includes a plurality of local storage resources accessible via said local addresses and programmatically linked to a plurality of virtual addresses, and to a plurality of network resources accessible via said network addresses;

dynamically configure an address space installed within said computer-implemented system, such that data required to be processed by said computer-implemented system is stored in part in said local storage resources accessible via said local addresses, and in part in said network resources accessible via said network addresses, and such that said data could be retrieved on said computer-implemented system from said local storage resources and said network resources based on said mapping; and retrieve, based on said mapping, data from a predetermined network address, and store said data on a predetermined local address, only in an event said data is deemed to be used frequently by said computer-implemented system, and rendering said data locally accessible to said computer-implemented system based on said mapping between said virtual addresses, said local storage addresses, and said network addresses.

* * * * *